(12) United States Patent
Pindeus et al.

(10) Patent No.: US 10,913,454 B2
(45) Date of Patent: Feb. 9, 2021

(54) SYSTEMS AND METHODS FOR PREDICTING PEDESTRIAN INTENT

(71) Applicant: Humanising Autonomy Limited, London (GB)

(72) Inventors: Maya Audrey Lara Pindeus, London (GB); Raunaq Bose, London (GB); Leslie Cees Nooteboom, London (GB); Adam Joshua Bernstein, Palo Alto, CA (US)

(73) Assignee: Humanising Autonomy Limited, London (GB)

( * ) Notice: Subject to any disclaimer, the term of this patent is extended or adjusted under 35 U.S.C. 154(b) by 165 days.

(21) Appl. No.: 16/219,566

(22) Filed: Dec. 13, 2018

(65) Prior Publication Data
US 2019/0176820 A1 Jun. 13, 2019

Related U.S. Application Data

(60) Provisional application No. 62/598,359, filed on Dec. 13, 2017.

(51) Int. Cl.
*B60W 30/095* (2012.01)
*G06K 9/00* (2006.01)
(Continued)

(52) U.S. Cl.
CPC ........ *B60W 30/0956* (2013.01); *B60W 30/09* (2013.01); *G06F 16/29* (2019.01);
(Continued)

(58) Field of Classification Search
CPC ...... B60W 30/095; B60W 30/09; G06K 9/00; H04N 7/15; H04N 7/18; H04L 12/58
See application file for complete search history.

(56) References Cited

U.S. PATENT DOCUMENTS

2008/0298687 A1* 12/2008 Lai .......................... G06T 7/254
382/218
2010/0074472 A1* 3/2010 Garoutte ............ G06K 9/00771
382/103
(Continued)

FOREIGN PATENT DOCUMENTS

CN 105740783 A * 7/2016 ................ G06K 9/00
CN 105740783 A 7/2016
(Continued)

OTHER PUBLICATIONS

International Search Report and Written Opinion, PCT Application No. PCT/IB2018/001557, dated May 21, 2019, 18 pages.
(Continued)

*Primary Examiner* — P. E. Yuri Kan
(74) *Attorney, Agent, or Firm* — Fenwick & West LLP

(57) ABSTRACT

A system and a method are disclosed for determining intent of a human based on human pose. In some embodiments, a processor obtains a plurality of sequential images from a video feed, and determines respective keypoints corresponding a human in each respective image of the plurality of sequential images. The processor aggregates the respective keypoints for each respective image into a pose of the human and transmits a query to a database to find a template that matches the pose by comparing the pose to a plurality of templates poses that translate candidate poses to intent, each template corresponding to an associated intent. The processor receives a reply message from the database that either indicates an intent of the human based on a matching template, or an inability to locate the matching template, and, in response to the reply message indicating the intent of the human, outputs the intent.

18 Claims, 11 Drawing Sheets

(51) Int. Cl.
*B60W 30/09* (2012.01)
*H04N 7/18* (2006.01)
*H04N 7/15* (2006.01)
*H04L 12/58* (2006.01)
*G06F 16/29* (2019.01)
*G06K 9/62* (2006.01)

(52) U.S. Cl.
CPC ..... *G06K 9/00335* (2013.01); *G06K 9/00348* (2013.01); *G06K 9/00355* (2013.01); *G06K 9/00369* (2013.01); *G06K 9/00744* (2013.01); *G06K 9/00805* (2013.01); *G06K 9/6202* (2013.01)

(56) References Cited

U.S. PATENT DOCUMENTS

| | | | | |
|---|---|---|---|---|
| 2010/0246968 | A1* | 9/2010 | Hoshino | H04N 5/23229 382/190 |
| 2011/0025834 | A1* | 2/2011 | Chen | G06T 7/73 348/77 |
| 2013/0329000 | A1* | 12/2013 | Cain | H04N 7/152 348/14.08 |
| 2017/0057497 | A1* | 3/2017 | Laur | G06K 9/00805 |
| 2017/0272374 | A1 | 9/2017 | Myers et al. | |
| 2018/0322787 | A1* | 11/2018 | Shimizu | G08G 1/165 |
| 2019/0028411 | A1* | 1/2019 | Singh | H04L 51/32 |

FOREIGN PATENT DOCUMENTS

| | | |
|---|---|---|
| EP | 3358546 A1 | 8/2018 |
| WO | WO 2017/056382 A1 | 4/2017 |

OTHER PUBLICATIONS

Kokubo, Y., et al., "Add-On Strategies for Fine-Grained Pedestrian Classification," 2016 International Conference on Digital Image Computing: Techniques and Applications (DICTA), Nov. 2016, 6 pages.

Luvizon, D.C., et al., "Human Pose Regression by Combining Indirect Part Detection and Contextual Information," ArXiv, Oct. 6, 2017, 10 pages.

* cited by examiner

SYSTEMS AND METHODS FOR PREDICTING PEDESTRIAN INTENT

CROSS REFERENCE TO RELATED APPLICATIONS

This application claims the benefit of U.S. Provisional Application No. 62/598,359, filed Dec. 13, 2017, which is hereby incorporated by reference herein in its entirety.

TECHNICAL FIELD

The disclosure generally relates to the field of computer vision guiding automated or autonomous vehicles, and more specifically applying computer vision to predict pedestrian intent.

BACKGROUND

Related art systems that determine pedestrian intent use crude and rudimentary means to perform intent determination, such as analyzing a direction or speed in which a pedestrian is traveling, and analyzing a pedestrian's distance from an edge of a road. The related art systems ingest these variables into a static model to crudely determine a most likely intent of a user. This approach is an overbroad, one-size-fits-all approach that fails to assess, among other things, human body language in the form of explicit or implicit gestures, and a human's awareness of his or her surroundings. From a technical perspective, related art systems lack technical sophistication to understand human pose based on a sequence of images of a human being, and thus cannot translate gesture or awareness information to a more accurate intent prediction.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
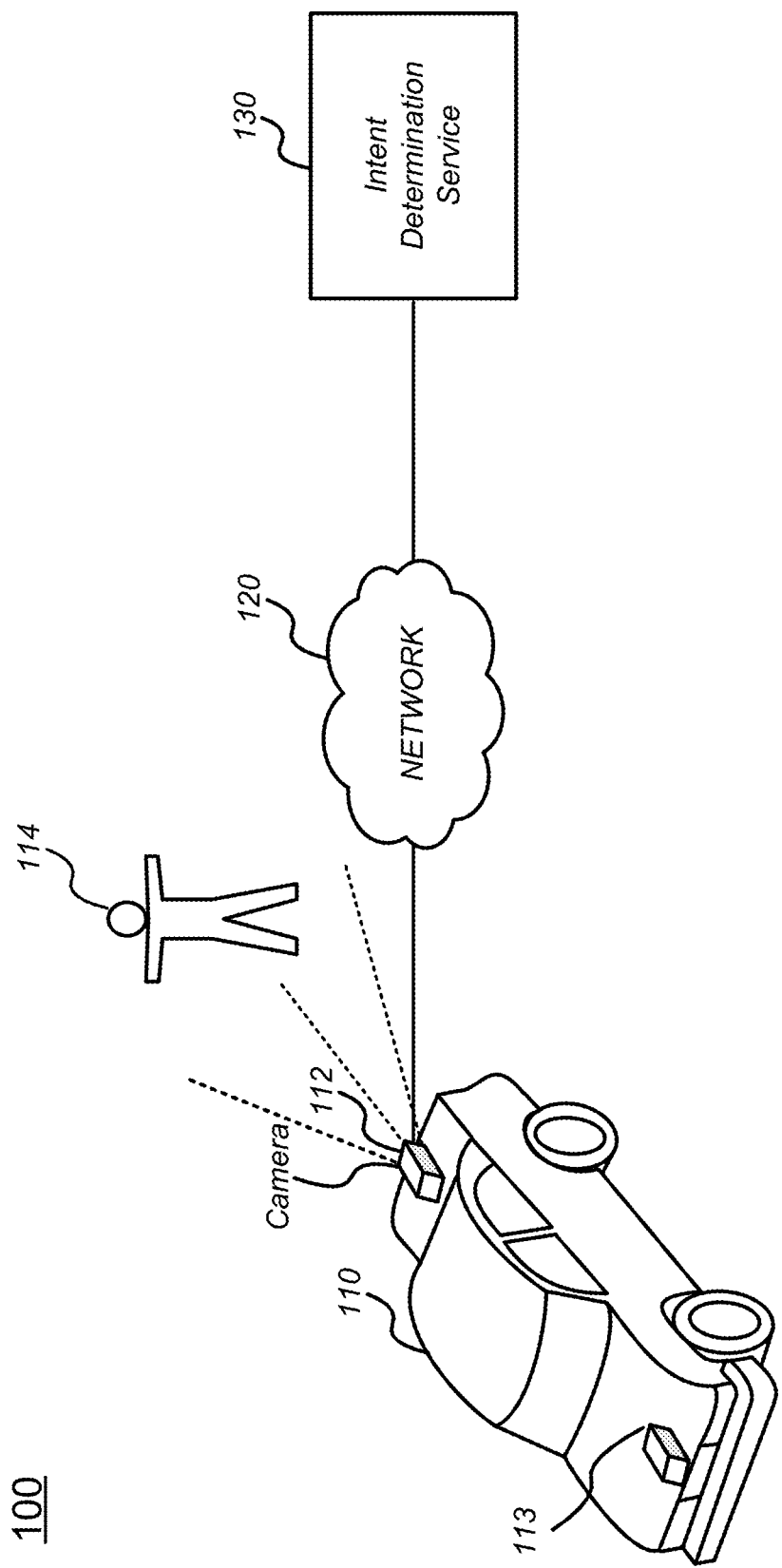
FIG. 1 illustrates one embodiment of a system where intent of a human is determined using an intent determination service, in accordance with some embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes determining intent of a human by translating sequential images of the human (e.g., from a video) into a collection of keypoints to determine the human's pose. The determined pose is then mapped to an intent of the human based on known pose-to-intent mappings. These pose-to-intent mappings may differ based on geography of where the video is captured to account for different gestures and mannerisms that feed into a pose potentially signaling different intent depending on a human's culture. To this end and others, in some embodiments of the disclosure, a processor obtains a plurality of sequential images from a feed, provided by a vision and/or depth sensor such as a camera (e.g., the camera providing a video feed), a far infrared sensor, LIDAR, and the like. In a scenario where a camera is providing a video feed, the camera may be mounted on or near a dashboard of an autonomous vehicle, or anywhere else on or in the vehicle (e.g., integrated into the bodywork of the vehicle). The processor determines respective keypoints corresponding a human in each respective image of the plurality of sequential images, such as points corresponding to a human's head, arms, and legs, and their relative locations to one another as they change from image to image of the sequential images.

The processor aggregates the respective keypoints for each respective image into a pose of the human. For example, based on movement of the human's legs across the sequence of images as determined from an analysis of the keypoints, the processor aggregates the keypoints into a vector showing the movement of the keypoints across the images. The processor then transmits a query to a database to compare the pose to a plurality of templates poses that translate candidate poses to intent, in order to determine whether the pose is known to map to a given intent, such as an intent to run across the street. The processor receives a reply message from the database that either indicates an intent of the human or an inability to locate a matching template, and, in response to the reply message indicating the intent of the human, the processor outputs a command corresponding to the intent (e.g., to halt the vehicle, or to alert a driver of the vehicle).

System Overview

FIG. 1 illustrates one embodiment of a system where intent of a human is determined using an intent determination service, in accordance with some embodiments of the disclosure. System 100 includes vehicle 110. While vehicle 110 is depicted as a car, vehicle 110 may be any motorized device that is configured to autonomously, or semi-autonomously, navigate near humans. As used herein, the term "autonomous" and its variations refers to fully automated operation, or semi-automated operation where human input is relied upon to operate some features but not others (e.g., "semi-autonomously"). For example, vehicle 110 may be a drone, or a bipedal robot, that is configured to fly or walk in the vicinity of humans without being commanded (or while being commanded to perform at least some features) to navigate in any particular direction or at any particular speed. Vehicle 110 is configured to operate safely around humans by, among other things, determining (or being told) an intent of a nearby human, such as human 114, and taking an action consonant with the safety of human 114 in view of the intent of human 114.

Camera 112 is operably coupled to vehicle 110, and is used to determine an intent of human 114. Other sensors 113 may be operably coupled to vehicle 110, such as a microphone, to supplement an intent determination of human 114 (e.g., if human 114 speaks "I am going to run across the street now," vehicle 110 may activate a safe mode where vehicle 110 slows or stops the vehicle to avoid a collision based on the microphone input). As used herein, the term "operably coupled" refers to a direct attachment (e.g., hardwired or built into a same circuit board), an indirect attachment (e.g., two components connected through wires or through wireless communications protocols), and the like. A sequence of images is captured by camera 112, and is fed to intent determination service 130 over network 120. Technical aspects of network 120 will be described in further detail with respect to FIG. 2. Intent determination service 130 determines an intent of human 114, as will be described in further detail with respect to other figures, such as FIG. 3, in the below disclosure. While network 120 and intent determination service 130 are depicted as being separate from vehicle 110, network 120 and/or intent determination service 130 may be, in whole or in part, implemented within vehicle 110.

Computing Machine Architecture

Figure 2:
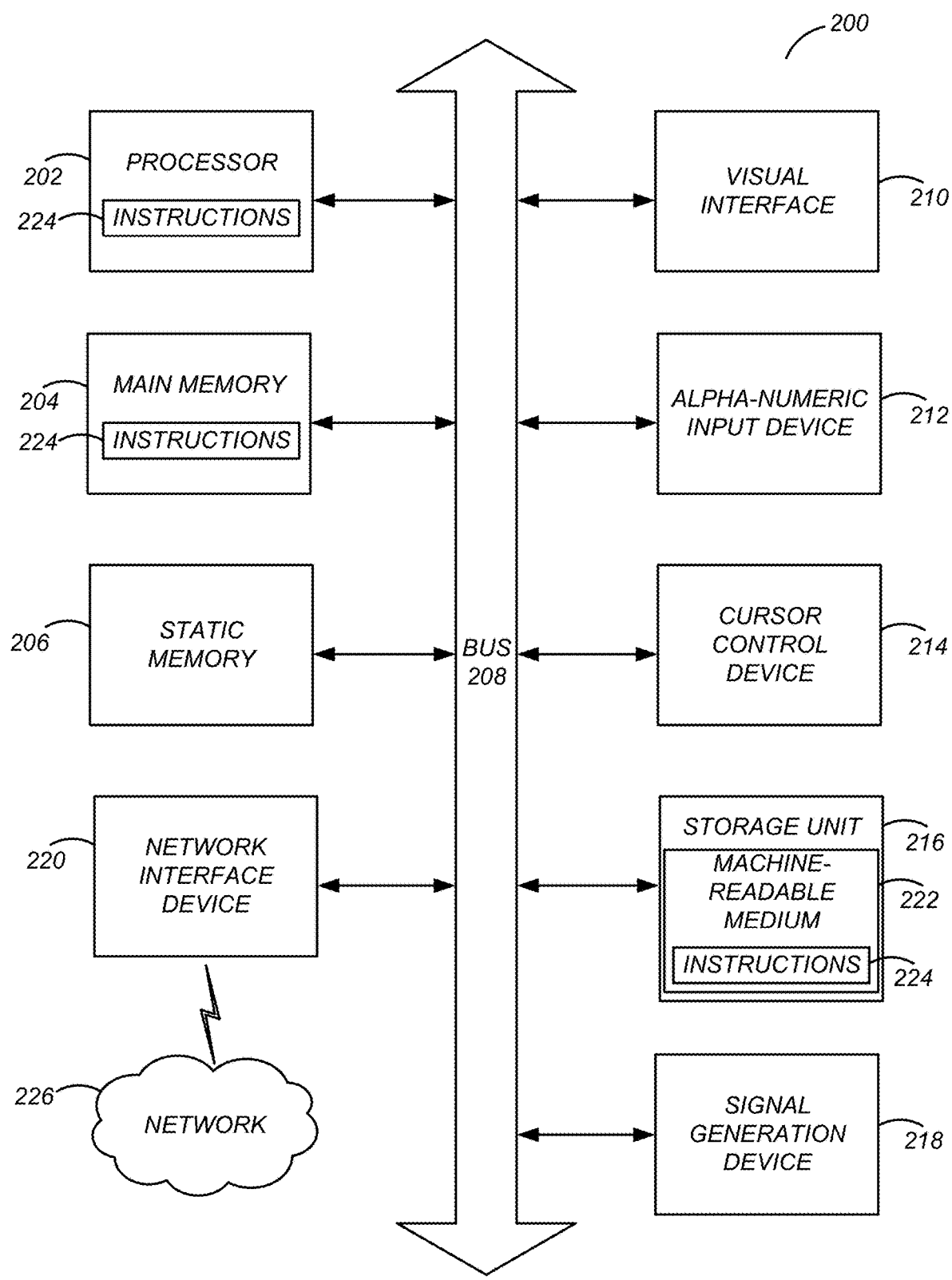
FIG. 2 illustrates one embodiment of block diagram illustrating components of an example machine able to read instructions from a machine-readable medium and execute them in a processor (or controller), in accordance with some embodiments of the disclosure.

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. The program code may be comprised of instructions 224 executable by one or more processors 202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, an on-board vehicle computer (e.g., a computer implemented within vehicle 110 for operating vehicle 110), an infrastructure computer, or any machine capable of executing instructions 224 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include visual display interface 210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alphanumeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208. Signal generation device 218 may output signals to visual interface 210 or to other devices, such as a vibration generator, a robotic arm, and the like, to warn a human driver of vehicle 110 of a danger to a pedestrian (e.g., by vibrating the driver's seat to get the driver's attention, displaying an alert, using the robotic arm to tap the driver if processor 202 determines that the driver has fallen asleep, and the like).

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Intent Determination Service Structure

Figure 3:
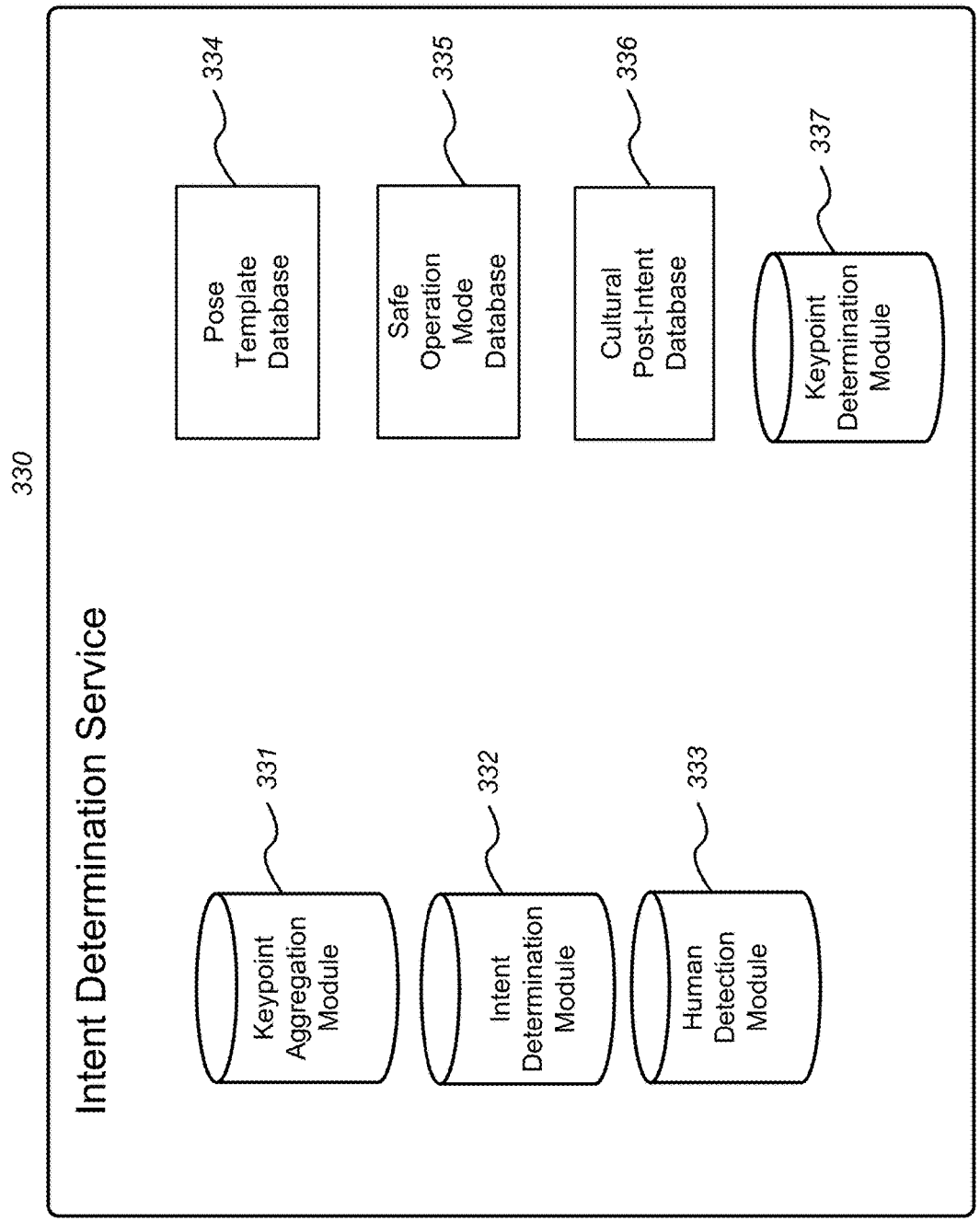
FIG. 3 illustrates one embodiment of an intent determination service, including modules and databases that support the service, in accordance with some embodiments of the disclosure.

As mentioned above, the systems and methods described herein are generally directed to determining intent of a human (e.g., human 114) based on pose of the human as determined from images of a camera mounted on, or integrated in, an autonomous vehicle (e.g., camera 112 of vehicle 110). The images are ingested by a processor of intent determination service 130 (e.g., processor 202). FIG. 3 illustrates one embodiment of an intent determination service, including modules and databases that support the service, in accordance with some embodiments of the disclosure. Intent determination service 330 is a close-up look at intent determination service 130, and has the same functionality as described herein. Intent determination service 330 may be a single server including the various modules and databases depicted therein, or may be distributed across multiple servers and databases. As described above, intent determination service 330 may be implemented, in whole or in part, within vehicle 110. The distributed servers and databases may be first-party or third-party services and databases, accessible by way of network 120.

Figure 4:
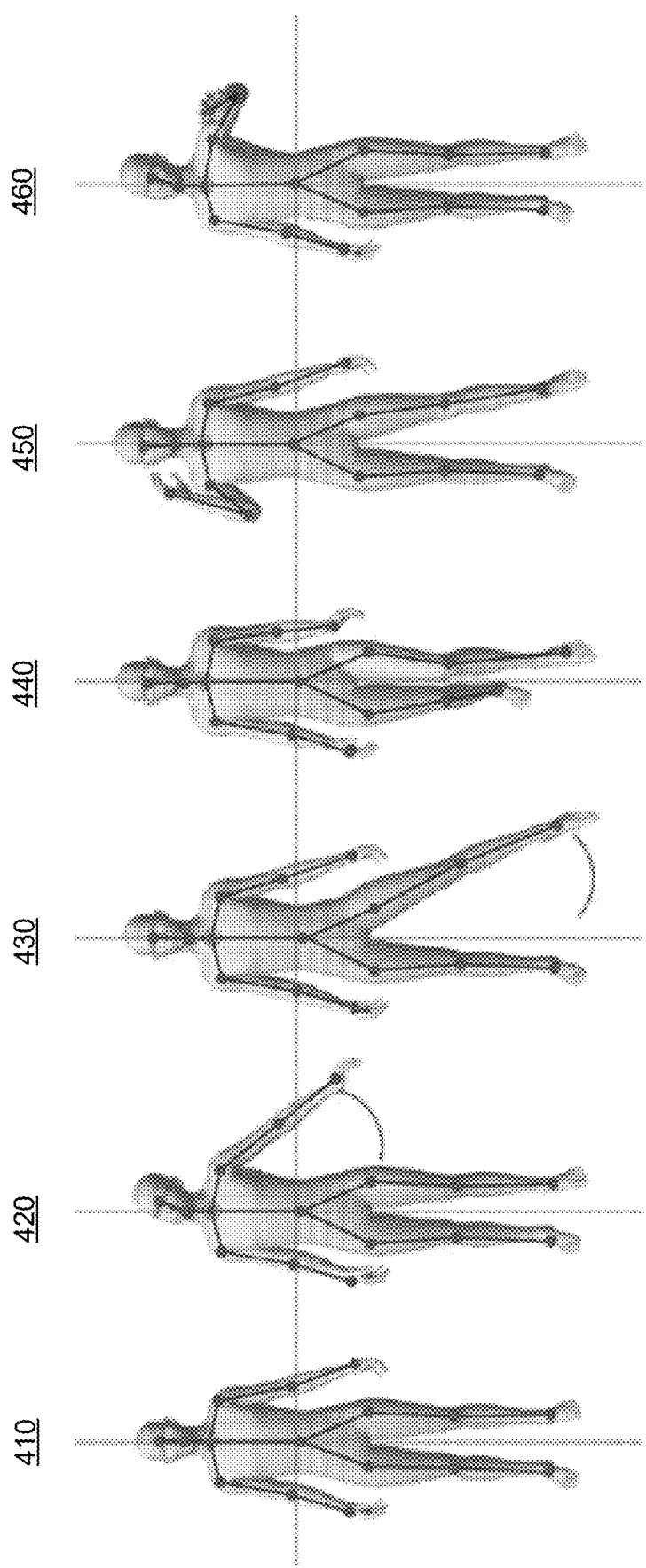
FIG. 4 depicts keypoints for pose detection in connection with various human activities, in accordance with some embodiments of the disclosure.

Intent determination service 330 includes keypoint determination module 337. After ingesting the images from camera 112, processor 202 of intent determination service 330 executes human detection module 333. Human detection module 333 determines whether a human is in an image by using computer vision and/or object recognition techniques in analyzing a composition of the image to determine whether edges or other characteristics within the image match a known form of a human. Upon determining that there is a human in the images, processor 202 of intent determination service 330 executes keypoint determination module 337 to determine keypoints of the human. This determination will be described with respect to FIG. 4. FIG. 4 depicts keypoints for pose detection in connection with various human activities, in accordance with some embodiments of the disclosure. Human 410 is standing in a neutral position, without making a gesture. Keypoints are indicated by circles overlaid on top of human 410. Lines are used to illustrate pose features, which will be described in further detail below.

Keypoint determination module 337 determines where keypoints are on human 410. Keypoint determination module 337 determines where keypoints are, for example, by first identifying contours of the human body, and then matching predefined points of the human body as keypoints based on the contours, or any other method of keypoint/pose determination. For example, keypoint determination module 337 may reference a template human image instructing keypoints to be applied at ankles, knees, thighs, center of torso, wrists, elbows, shoulders, neck, and forehead of each human being. Keypoint determination module 337 may identify each of these points by comparing the human image to a template human image, where the template points to features corresponding to each area a keypoint exists. Alternatively, keypoint determination module 337 may be configured to differentiate and identify, using computer vision, each body part where a keypoint is to be applied, and may locate these body parts and apply the keypoints. As depicted by humans 420, 430, 440, 450, and 460, keypoint determination module 337 is configured to identify keypoints on a human regardless of differing poses of the human. Manners in which human poses are considered are described with reference to other modules of FIG. 3 below.

After determining what keypoints to use for each image where a human is present (e.g., human 114), processor 202 of intent determination service 330 executes keypoint aggregation module 331. Keypoint aggregation module 331 may aggregate keypoints for a single image, or for a series of sequential images. Aggregating keypoints for a single image creates a representation of a pose at a particular point in time. Aggregating keypoints for a series of sequential images creates a vector of keypoint movement over time, which may map to a known movement or gesture. In the case where keypoint aggregation module 331 is aggregating keypoints for a single image, referring again to FIG. 4, keypoint aggregation module 331 may aggregate the keypoints by mapping them with straight-line connectors.

Keypoint aggregation module 331 determines which keypoints to connect in such a manner based on predefined schema. For example, as discussed above, keypoint module 331 is aware that each keypoint corresponds to a specific body part (e.g., ankle, knee, thigh, etc.). Keypoint aggregation module 331 accesses the predefined schema to determine that an ankle keypoint is to be connected to a knee keypoint, which is to be connected to a thigh keypoint, and so on. These keypoint straight-line connectors are depicted for each human 410, 420, 430, 440, 450, and 460 depicted in FIG. 4. Rather than, or in addition to, storing or generating straight-line connectors, keypoint aggregation module 331 may store distances between each keypoint of the predefined schema. As will be described later on, the relative locations of these lines, or the distance between keypoints, will be used to determine a pose of a user. For example, the distance between human 450's hand and head is far smaller than the distance between human 410's hand and head, which may be used to determine, for human 450, that human 450 is likely holding a telephone to his head.

In a case where keypoint aggregation module 331 is aggregating keypoints for a series of images, keypoint aggregation module 331 may aggregate keypoints for each individual image, and then compute a movement vector for each keypoint from each image to each next image of the sequence. For example, in a scenario where a first image includes human 410, and a next image includes human 430, who is the same human as human 410 but in a different pose, keypoint aggregation module 331 computes a motion vector to describe a translation of the human's left foot and knee movement between the two images. This motion vector is illustrated with a line at the bottom of human 430 showing a distance between where the left foot keypoint used to be, and where it moved.

Figure 5:
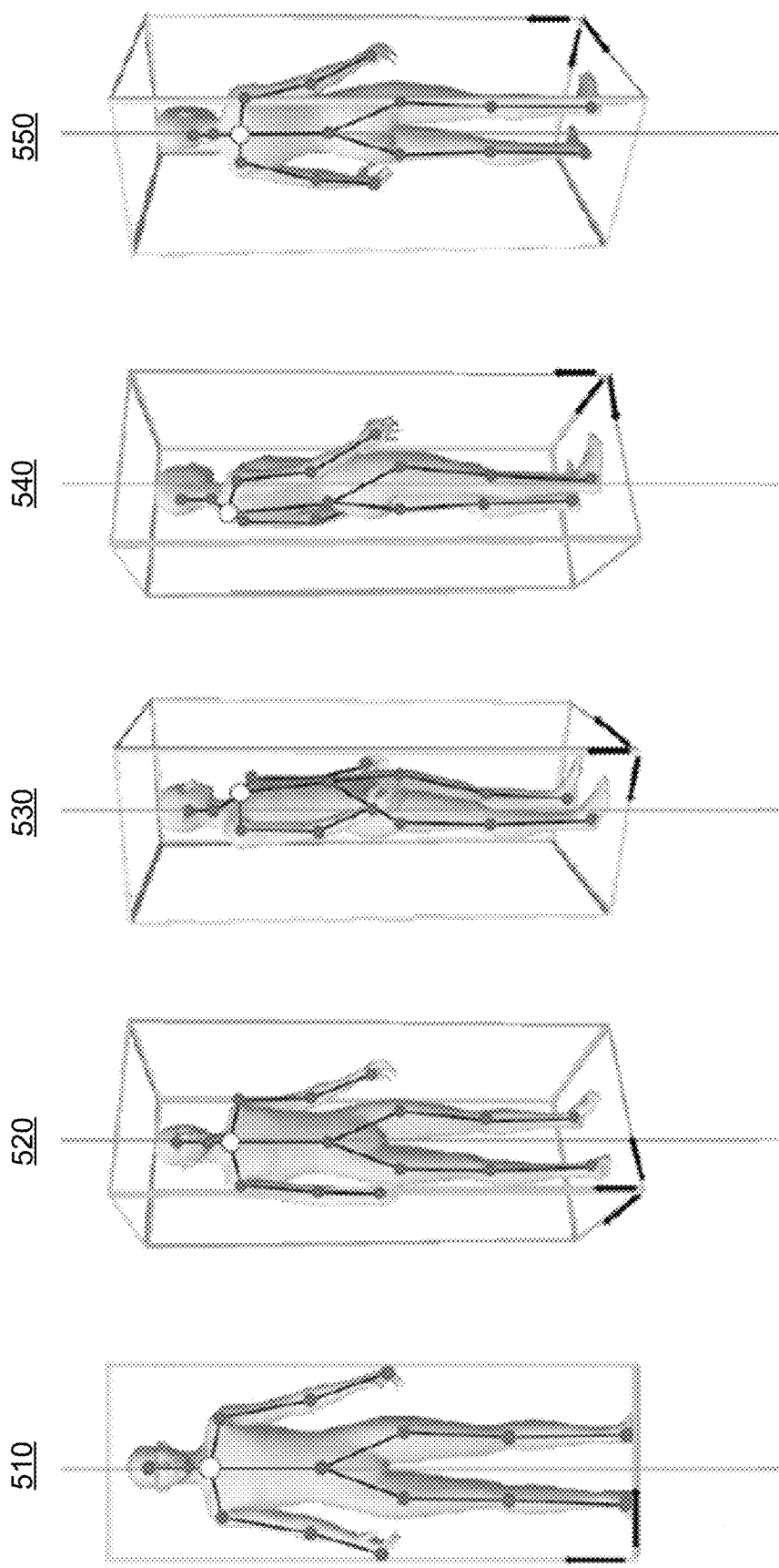
FIG. 5 depicts keypoints for detecting a same pose regardless of a direction a human is facing relative to a camera, in accordance with some embodiments of the disclosure.

Keypoint aggregation module 331 may also indicate a direction in which a user is moving or facing based on the movement of keypoints between images, and based on a location of keypoints with reference to other objects in an image. FIG. 5 depicts keypoints for detecting a same pose regardless of a direction a human is facing relative to a camera, in accordance with some embodiments of the disclosure. Keypoint aggregation module 331 may determine, based on a nearness of keypoints when looking at an image in two-dimensional space, what direction a human is facing. For example, human 114 is depicted in FIG. 5 in various rotated positions, such as positions 510, 520, 530, 540, and 550. In image 540, as compared to image 510, shoulder and neck keypoints are close to one another. These relative distances between keypoints, and the change in these relative distance between keypoints between images, are analyzed by keypoint aggregation module 331 to determine a rotation of human 114 in three-dimensional space. Keypoint aggregation module 331, in determining the rotation, is able to detect a direction that human 114 is rotating toward, and is able to, in conjunction with understanding other objects in the image (e.g., road, curb), feed this information with the keypoint aggregation to intent determination module 332 to determine user intent based on rotation.

After aggregating the keypoints, processor 202 of intent determination service 330 executes intent determination module 332 and feeds the aggregated keypoints, along with, optionally, additional information. Intent determination module 332 uses the aggregated keypoints, along with potentially the additional information, to determine intent of human 114. In some embodiments, intent determination module 332 labels the aggregated keypoints as a pose. A pose, as used herein, may be a static stature of a human at a given point of time, or a movement of the human, such as a gesture. Thus, the labeled pose may be a collection of static poses, or a vector, as described above, describing the motion between keypoints from image-to-image.

Intent determination module 332 queries pose template database 334 to determine intent of human 114. Pose template database 334 includes entries of various keypoint aggregations and motion vectors between aggregations. These entries are mapped to a corresponding pose. For example, referring back to FIG. 4, template database 334 may include a record of a keypoint aggregation matching the keypoint aggregation for human 450, and may point to a corresponding pose of "on telephone." Any number of corresponding poses may be mapped to keypoint aggregations and motion vectors, such as standing, sitting, bicycling, running, on telephone, holding hands with another human, and so on. Moreover, the keypoint aggregation may match to more than one record. For example, the keypoint aggregation may match both a template corresponding to running, and a template corresponding to being on the phone.

Figure 6:
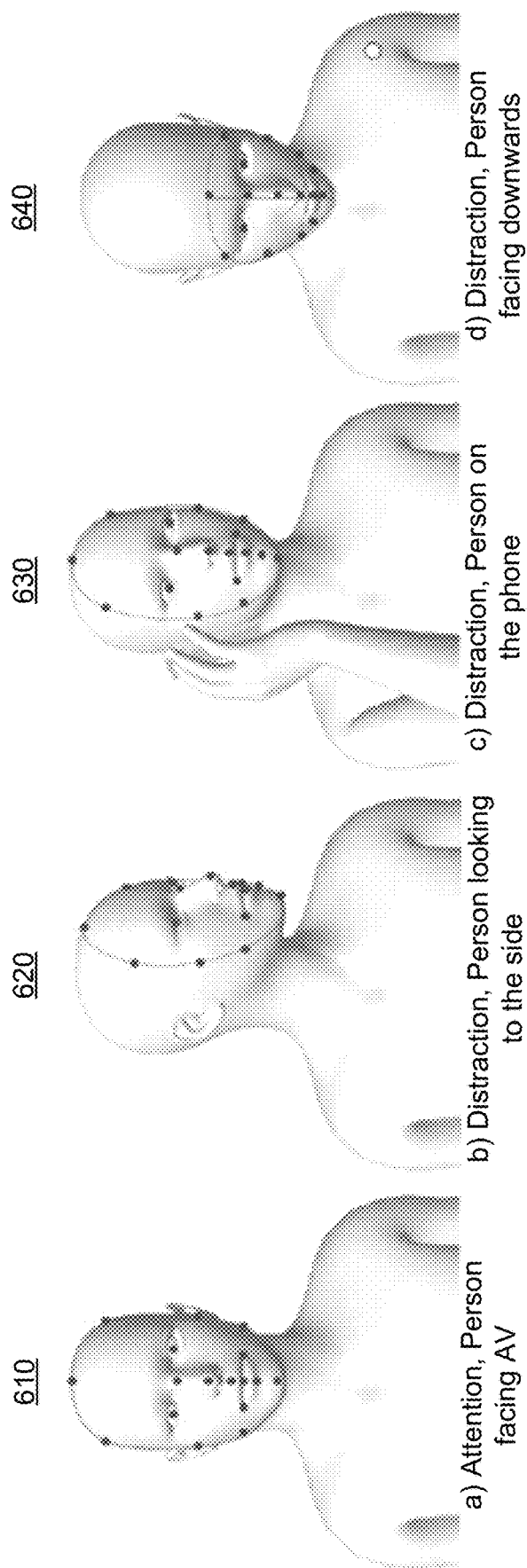
FIG. 6 depicts keypoints for detecting whether a user is attentive, and for detecting types of distractions, in accordance with some embodiments of the disclosure.

Pose template database 334 may map keypoint aggregations to characteristics of human 114 that go beyond a motion or stance of human 114, and also include state of mind. FIG. 6 depicts keypoints for detecting whether a user is attentive, and for detecting types of distractions, in accordance with some embodiments of the disclosure. Pose template database 334 maps keypoint aggregations for, e.g., the face of human 114 to whether the user is distracted or paying attention, and, if the human is distracted, pose template database 334 may additionally map the keypoint aggregation to a reason for the distraction. For example, pose template database 334 may include record 610, which maps a keypoint aggregation to human 114 being attentive. Pose template 334 may also include records 620, 630, and 640, which each map to a human being distracted, and which respectively map to the human being distracted due to looking to the side, being on the phone, and facing downward. Intent determination module 332 may, upon receiving a matching template from pose template 334 in response to a query, determine that a pose of human 114 matches one or more poses and states of mind.

Figure 7:
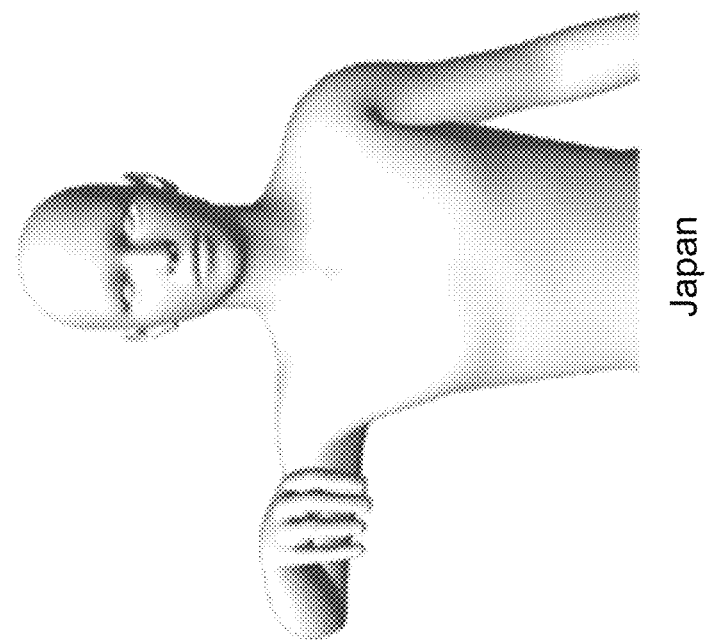
FIG. 7 depicts an illustration of gesture differentiation based geography, in accordance with some embodiments of the disclosure.
Figure 7:
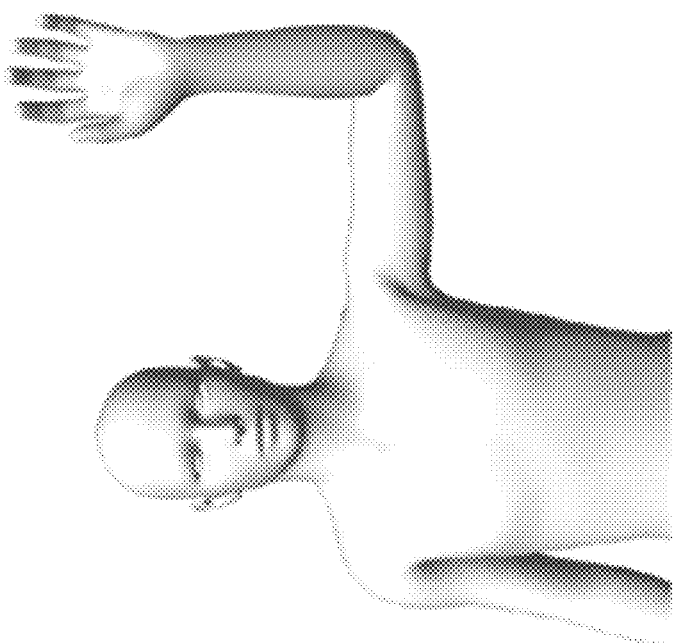

There are scenarios where a same pose may mean two different things, depending on where the pose was made. For example, if human 114 was to hold up his hand in Europe, a normal cultural response would be to take this as a signal to stop. If human 114 was to hold up his hand in a country where this gesture was normally meant to continue, then it would be erroneous for intent determination module 332 to determine that this is a gesture to stop based on a record in pose template database 334 showing a correspondence between the keypoints and such a meaning. Thus, in some embodiments, pose template database 334 merely indicates the specifics of what a pose is—e.g., a human's hand is being waved, and another database—cultural pose-intent database 336—translates that pose to a human's desire or intent based on a geographical location of the human. This translation will be described with respect to FIG. 7, which depicts an illustration of gesture differentiation based geography, in accordance with some embodiments of the disclosure.

Using the systems and methods described above, intent determination module 332 determines that human 710 is raising his hand, and determines that human 720 is holding his hand horizontally based on entries in pose template database 334. After making this determination, intent determination module 332 references the determined pose of human 710 and human 720 against entries of cultural pose-intent database 336. Cultural pose-intent database 336 maps poses to intent based on a location in which the images from which the pose was determined were taken. For example, the image of human 710 was taken in Europe, whereas the image of human 720 was taken in Japan. Each entry of cultural pose-intent database 336 maps a pose to a cultural meaning corresponding to the location in which the image was taken. Thus, the meaning of the pose of human 710 will be determined based on an entry corresponding to locations in Europe, whereas the meaning of the pose of human 720 will be determined based on an entry corresponding to a location of Japan. In some embodiments, cultural pose-intent database 336 is distributed among several databases, each database corresponding to a different location. The appropriate database may be referenced based on the geographic location in which the image is taken. In scenarios where intent determination service 330 is installed in part, or in full, within vehicle 110, processor 202 may automatically download data from cultural pose-intent database 336 in response to detecting that vehicle 110 has entered a new geographical location (e.g., when vehicle 110 crosses a boundary into a different city, state, country, principality, etc.). This improves efficiency of the system by avoiding latency in requesting cultural pose-intent data over an external network (e.g., network 120).

Figure 8:
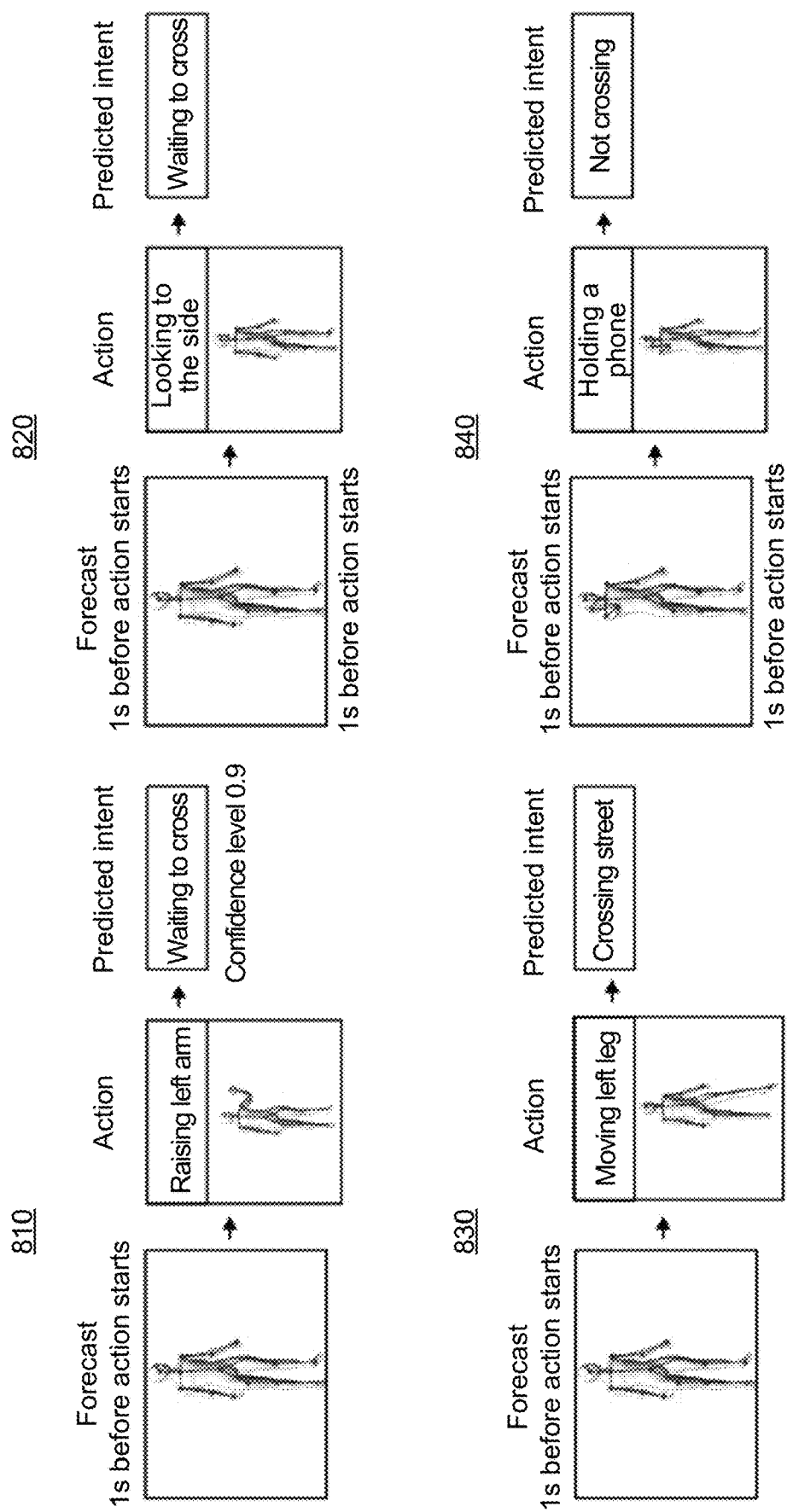
FIG. 8 depicts a flow diagram for mapping several illustrative poses to a predicted intent, in accordance with some embodiments of the disclosure.

After determining a pose of human 114 and, optionally determining other information, such as the cultural meaning of a pose and whether human 114 is distracted in the manners described above, intent determination module 332 is able to predict an intent of human 114. FIG. 8 depicts a flow diagram for mapping several illustrative poses to a predicted intent, in accordance with some embodiments of the disclosure. In practical terms, the data flows shown in FIG. 8 need not begin every time a human is detected by human detection module 333. For example, if a human is detected by human detection module 333, but the human is determined to be far from vehicle 110, or from a path vehicle 110 is progressing along, then the intent of the human is immaterial to the progression of vehicle 110 and thus need not be determined. Accordingly, in some embodiments, processor 202 of intent determination service 330 may determine, when human detection module 333 detects human 114, an initial forecast of whether activity of human 114 may impact whether vehicle 110 will need to alter its progression along a path for the safety of human 114.

When intent determination service 330 determines an initial forecast that activity of human 114 may be material to the progression of vehicle 110, intent determination module 332 determines, as described above, a pose, and in some embodiments, its corresponding meaning, of human 114. Thus, as shown in data flow 810, intent determination module 332 determines that human 114 is raising a left arm. Intent determination module 332 determines therefrom a predicted intent of human 114. In some embodiments, pose template database 334 indicates an intent that matches a pose, as described above, and thus intent determination module 332 determines therefrom the intent of human 114, such as the human is waiting to cross, as indicated in data flow 810.

Pose-intent mappings in pose template database 334 may be supplemented by information from additional sources. For example, intent determination module 332 may use deep learning to translate a pose (and potentially additional information, such as a distance from human 114 to the road) to an intent of human 114. For example, given a dataset of labelled pedestrian intentions (such as crossing and not-crossing) that trains a deep learning framework, intent determination module 332 can predict whether data from next images of the sequence of images taken in real-time whether human 114 intends to cross, or not cross, and with what confidence.

Additionally, intent determination module 332 may perform a statistical analysis on the motion, body language, infrastructure interaction, activity, and behavior of human 114 to determine future action of human 114 given different inputs, such as previous actions of human 114, a classification of human 114 into a type (e.g., lone pedestrian, group, cyclist, disabled, child, etc.), velocity of pedestrian, context of interaction (e.g., crosswalk, middle of street, urban, rural, etc.). Further, intent determination module 332 may apply psychological behavioral models to refine intent predictions. Psychological behavior models relate to the ability of bottom-up, data-driven approaches such as the embodiments described above to be complemented or extended with the use of novel top-down behavioral and psychological models of pedestrian intent from computer vision of pedestrian motion, body language, and behavior. Yet further, intent determination module 332 may refine its predictions using sensors (e.g., sensors 113) beyond camera 112, such as microphones to analyze speech of human 114. Taking these refinements together, data flows 820, 830, and 840 show further examples of a translation of pose to intent as determined by intent determination module 332.

Figure 9:
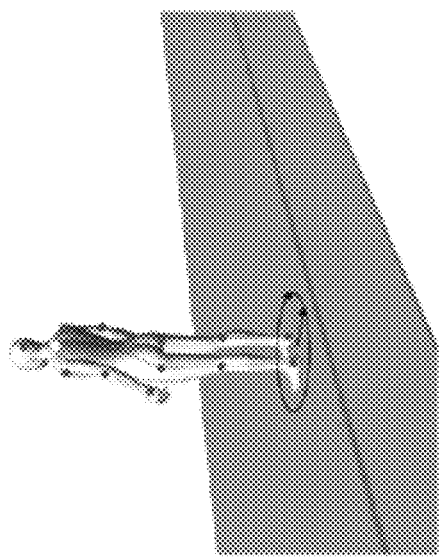
FIG. 9 depicts keypoints used, with reference to a landmark, to determine a person's orientation with reference to that landmark, in accordance with some embodiments of the disclosure.
Figure 9:
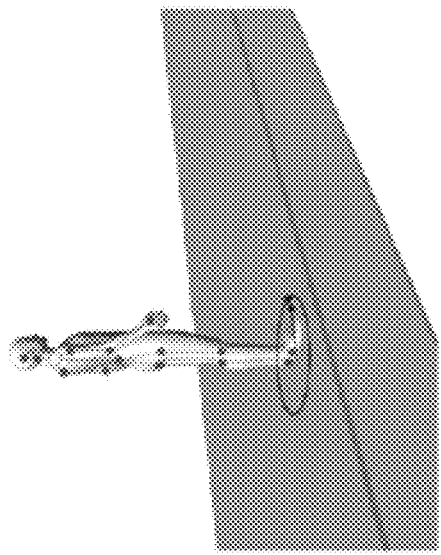
Figure 9:
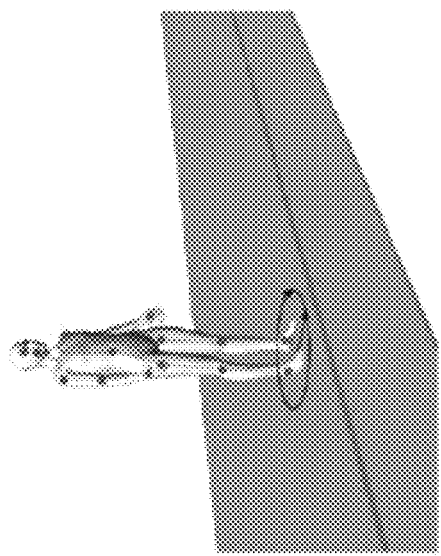

Nearness to a zone of danger of vehicle 110 is not the only factor on whether to trigger an intent determination for human 114. FIG. 9 depicts keypoints used, with reference to a landmark, to determine a person's orientation with reference to that landmark, in accordance with some embodiments of the disclosure. In image 910, human 114 is turned with his back to the curb, as determined using the above-described systems and methods. On this basis, intent determination module 332 may determine that human 114 is unlikely to approach the road and thus vehicle 110 need not alter its path based on the intent of human 114. However, in image 920, human 114 is turning toward the curb, and in image 930, human 114 is facing the curb. Based on these activities, image determination module 332 may determine that the intent of human 114 must be determined to ensure that if the intent of human 114 is to enter the road, vehicle 110 is commanded to avoid creating a hazard for human 114.

Figure 10:
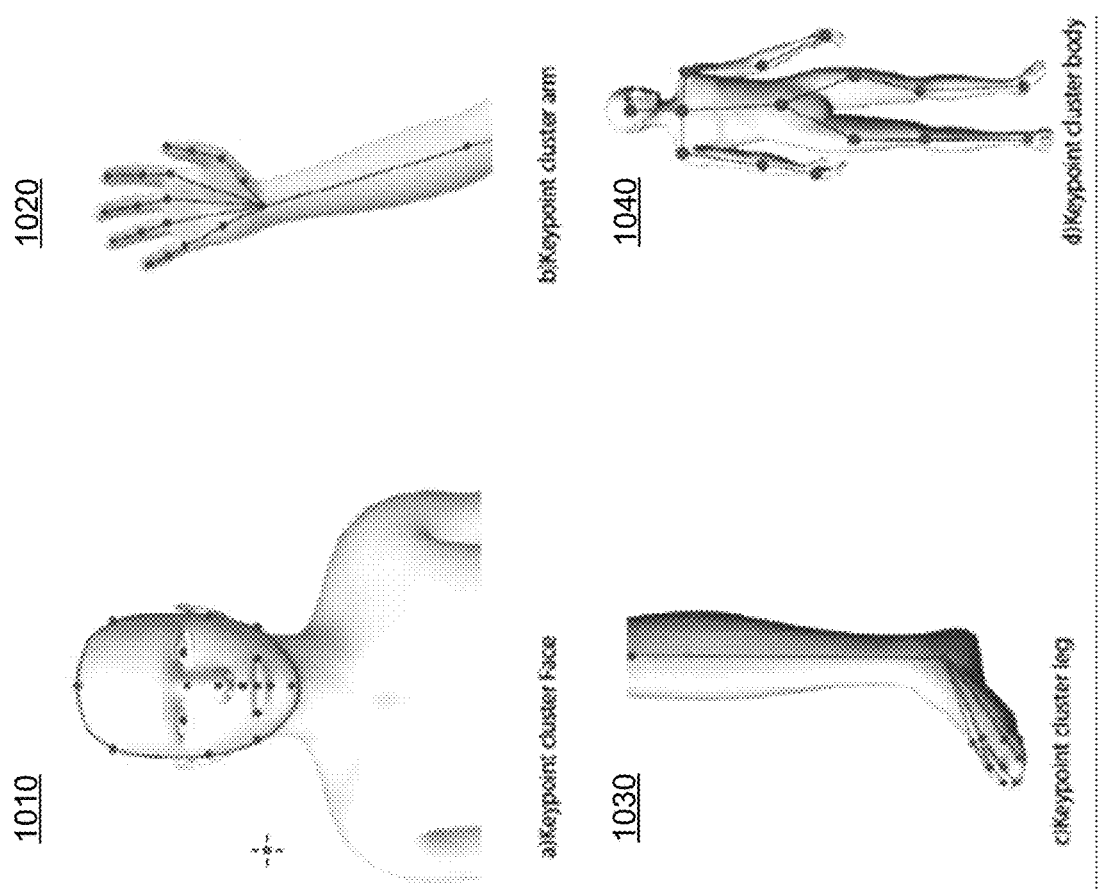
FIG. 10 depicts keypoint clusters for identifying various parts of a human's body, in accordance with some embodiments of the disclosure.

While the above description analyzes keypoints at a macro level, keypoint determination module 337 may determine keypoints granularly to provide more robust information for intent determination module 332 to process when determining intent of human 114. FIG. 10 depicts keypoint clusters for identifying various parts of a human's body, in accordance with some embodiments of the disclosure. Image 1010 shows exemplary keypoints for a human's face. By using a higher volume of keypoints, intent determination module is able to determine an emotional state of human 114 (e.g., frowning, happy, etc.) which provides more information by which intent determination module 332 is able to determine intent of human 114. Similarly, intent determination module 332 is able to determine with better accuracy gestures and similar by determining more keypoints in an arm, as shown in image 1020, a leg, as shown in image 1030, and a body, as shown in image 1040.

Figure 11:
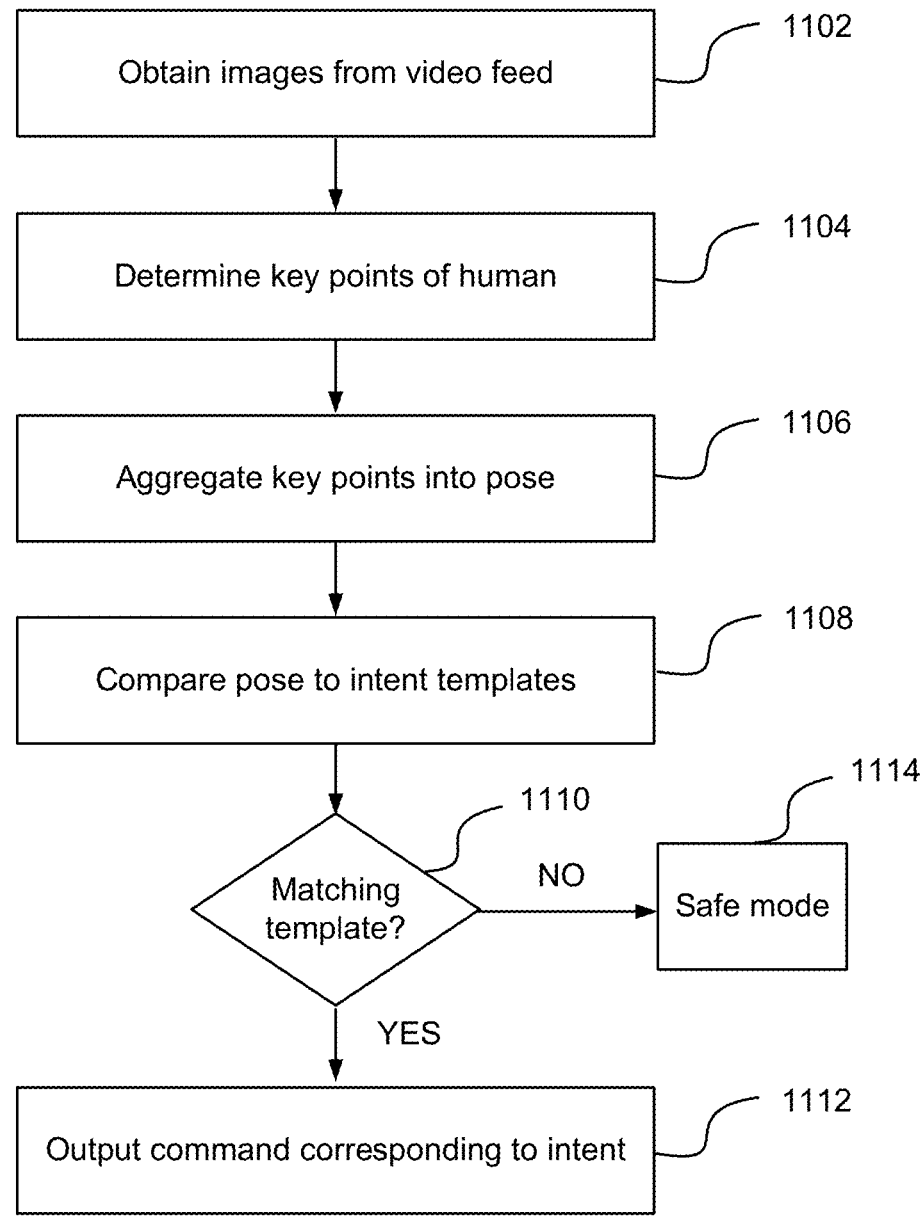
FIG. 11 depicts a flow diagram for translating images received from a video feed to an intent determination, in accordance with some embodiments of the disclosure.

FIG. 11 depicts a flow diagram for translating images received from a video feed to an intent determination, in accordance with some embodiments of the disclosure. Process 1100 begins with processor 202 of intent determination service 330 obtaining 1102 a plurality of sequential images from a video feed (e.g., from camera 112 by way of network 120, as described with reference to FIG. 1 above). The images may be obtained for a predetermined length of time or for a predetermined number of frames relative to a present time. Images where a human is not detected (e.g., by human detection module 333) may be discarded. Processor 202 of intent determination service 330 then determines 1104 respective keypoints corresponding to a human in each respective image of the plurality of sequential images (e.g., by executing keypoint determination module 337, as described above with reference to FIG. 3).

Processor 202 of intent determination service 330 then aggregates 1106 the respective keypoints for each respective image into a pose of the human (e.g., by executing keypoint aggregation module 331, as described above with respect to FIG. 3). If there are multiple humans in the image, then the keypoints for each human (or each human who's intent may influence operation of vehicle 110 as discussed above) are aggregated and a pose is determined for each. Processor 202 of intent determination service 330 then compares 1108 the pose to intent templates by, for example, executing intent determination module 332, which transmits a query to pose template database 334 to compare the pose to a plurality of templates poses that translate candidate poses to intent. Intent determination module 332 then determines 1110 whether there is a matching template. For example, intent determination module 332 receives a reply message from the database that either indicates an intent of the human or an inability to locate a matching template. If the reply message indicates the intent of the human, then intent determination module 332 determines that there was a matching template, and outputs 1112 a command corresponding to the determined intent (e.g., swerve to avoid human 114's motion, slow down to allow human 114 to cross, etc.).

If the reply message indicates an inability to locate a matching template, intent processor 202 of intent determination service 330 commands vehicle 110 to enter 1114 a safe mode. For example, intent determination service 330 may include a safe mode operation database 335. As discussed above, intent determination service 330 may determine from the sequence of images a position of the human and other obstacles and features within the images. Safe mode operation database 335 indicates, based on detected obstacles and features, and the relative distance of the human from those obstacles and features and from vehicle 110, a safe action to take in the absence of knowledge of human 114's intent. For example, the safe operation mode, when entered, includes commanding the vehicle to perform at least one of swerving, accelerating, ceasing movement, providing control to an operator, and sounding a horn or communicating a message through sound. The safe operation mode may be entered until either intent of human 114 is determined, or until human 114 leaves the field of vision of camera 112 or leaves a zone of danger, as determined based on objects detected within the field of vision of camera 112.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining intent of a human through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   obtaining a plurality of sequential images from a video feed;
   determining respective keypoints corresponding to a human in each respective image of the plurality of sequential images, at least two of the respective keypoints corresponding to different limbs of the human;
   aggregating the respective keypoints for each respective image into a pose of the human;
   selecting, from a plurality of cultural intent-pose databases, a cultural intent-pose database to be used in connection with translating the pose to an intent to exhibit respective future action, wherein the selecting is performed based on a location at which the video feed was taken, wherein the pose is indicated to be translated to a first intent by a first database of the plurality of cultural intent-pose databases corresponding to a first location, and wherein the pose is indicated to be translated to a second intent different from the first intent by a second database of the plurality of cultural intent-pose databases corresponding to a second location different from the first location;
   transmitting a query to the selected cultural intent-pose database to compare the pose to a plurality of template poses that translate candidate poses to intent to exhibit respective future action;
   receiving a reply message from the selected cultural intent-pose database that either indicates an intent of the human to exhibit a future action or an inability to locate a matching template; and
   in response to the reply message indicating the intent of the human to exhibit the future action, outputting a command corresponding to the intent.

2. The method of claim 1, further comprising, in response to the reply message indicating an inability to locate the matching template:
   outputting a command to a vehicle that is capturing the video feed to enter a safe operation mode;
   monitoring the video feed to determine when the human is no longer within an image of the video feed; and
   in response to determining that the human is no longer within the image of the video feed, outputting a command to cease operation of the safe operation mode.

3. The method of claim 2, wherein the safe operation mode may be any of a plurality of modes, wherein the command includes an indication of a particular one of the plurality of modes, and wherein the particular one of the plurality of modes is selected based on a position of the human and other obstacles relative to the vehicle.

4. The method of claim 2, wherein the safe operation mode, when entered, includes commanding the vehicle to perform at least one of swerving, accelerating, ceasing movement, providing control to an operator, outputting a visual, auditory, or multimedia message, and sounding a horn.

5. The method of claim 1, wherein selecting the cultural intent-pose database occurs responsive to detecting that a vehicle that is capturing the video feed has entered the location, and wherein data from the selected cultural intent-pose database is automatically downloaded responsive to detecting that the vehicle has entered the location.

6. The method of claim 1, further comprising:
    determining whether the plurality of sequential images comprises a human;
    in response to determining that the plurality of sequential images comprises the human, performing the determining of respective keypoints corresponding to the human in each respective image of the plurality of sequential images; and
    in response to determining that the plurality of sequential images does not comprise the human, discarding the plurality of sequential images and obtaining a next plurality of sequential images from the video feed.

7. The method of claim 1, wherein obtaining the plurality of sequential images from the video feed further comprises:
    determining an amount representing either a length of time prior to a present time, or an amount of sequential images prior to a presently captured image; and
    obtaining the amount of sequential images from the video feed relative to either a present time or a presently captured image.

8. The method of claim 1, wherein aggregating the respective keypoints for each respective image into the pose of the human comprises:
    determining a plurality of sets of keypoints, each set of keypoints corresponding to a discrete body part of the human;
    determining a vector of relative keypoint movements based on how each set of keypoints moves relative to each other set of keypoints; and
    including, in the pose, the vector of relative keypoint movements.

9. The method of claim 1, wherein the intent is determined using at least one of applying machine learning, statistical analysis, and a psychological behavioral model to each image of the plurality of sequential images.

10. A computer program product comprising a non-transitory computer readable storage medium having instructions encoded thereon that, when executed by a processor of a client device, cause the processor to:
    obtain a plurality of sequential images from a video feed;
    determine respective keypoints corresponding to a human in each respective image of the plurality of sequential images, at least two of the respective keypoints corresponding to different limbs of the human;
    aggregate the respective keypoints for each respective image into a pose of the human;
    select, from a plurality of cultural intent-pose databases, a cultural intent-pose database to be used in connection with translating the pose to an intent to exhibit respective future action, wherein the selecting is performed based on a location at which the video feed was taken, wherein the pose is indicated to be translated to a first intent by a first database of the plurality of cultural intent-pose databases corresponding to a first location, and wherein the pose is indicated to be translated to a second intent different from the first intent by a second database of the plurality of cultural intent-pose databases corresponding to a second location different from the first location;
    transmit a query to the selected cultural intent-pose database to compare the pose to a plurality of template poses that translate candidate poses to intent to exhibit respective future action,
    receive a reply message from the selected cultural intent-pose database that either indicates an intent of the human to exhibit a future action or an inability to locate the matching template; and
    in response to the reply message indicating the intent of the human to exhibit the future action, output the intent to exhibit the future behavior.

11. The computer program product of claim 10, wherein the instructions further cause the processor to, in response to the reply message indicating an inability to locate the matching template:
    output a command to a vehicle that is capturing the video feed to enter a safe operation mode;
    monitor the video feed to determine when the human is no longer within an image of the video feed; and
    in response to determining that the human is no longer within the image of the video feed, output a command to cease operation of the safe operation mode.

12. The computer program product of claim 11, wherein the safe operation mode may be any of a plurality of modes, wherein the command includes an indication of a particular one of the plurality of modes, and wherein the particular one of the plurality of modes is selected based on a position of the human and other obstacles relative to the vehicle.

13. The computer program product of claim 11, wherein the safe operation mode, when entered, includes commanding the vehicle to perform at least one of swerving, accelerating, ceasing movement, providing control to an operator, and sounding a horn.

14. The computer program product of claim 10, wherein selecting the cultural intent-pose database occurs responsive to detecting that a vehicle that is capturing the video feed has entered the location, and wherein data from the selected cultural intent-pose database is automatically downloaded responsive to detecting that the vehicle has entered the location.

15. The computer program product of claim 10, wherein the instructions further cause the processor to:
    determine whether the plurality of sequential images comprises a human;
    in response to determining that the plurality of sequential images comprises the human, perform the determining of respective keypoints corresponding to the human in each respective image of the plurality of sequential images; and
    in response to determining that the plurality of sequential images does not comprise the human, discard the plurality of sequential images and obtain a next plurality of sequential images from the video feed.

16. The computer program product of claim 15, wherein the instructions further cause the processor to, when obtaining the plurality of sequential images from the video feed:
    determining an amount representing either a length of time prior to a present time, or an amount of sequential images prior to a presently captured image; and
    obtaining the amount of sequential images from the video feed relative to either a present time or a presently captured image.

17. The computer program product of claim 10, wherein the instructions further cause the processor to, when aggregating the respective keypoints for each respective image into the pose of the human:
- determine a plurality of sets of keypoints, each set of keypoints corresponding to a discrete body part of the human;
- determine a vector of relative keypoint movements based on how each set of keypoints moves relative to each other set of keypoints; and
- include, in the pose, the vector of relative keypoint movements.

18. The computer program product of claim 10, wherein the intent is determined using at least one of applying machine learning, statistical analysis, and a psychological behavioral model to each image of the plurality of sequential images.

\* \* \* \* \*